United States Patent
Zhang et al.

(10) Patent No.: US 12,052,168 B2
(45) Date of Patent: Jul. 30, 2024

(54) ROUTE TARGET CONSTRAINT TO FILTER ROUTES ADVERTISED TO A NODE IN A SEAMLESS MPLS OR SEAMLESS SR NETWORK

(71) Applicant: Juniper Networks, Inc., Sunnyvale, CA (US)

(72) Inventors: Zhaohui Zhang, Westford, MA (US); Shraddha Hegde, Bangalore (IN); Srihari Ramachandra Sangli, Bengaluru (IN); Kaliraj Vairavakkalai, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/301,354

(22) Filed: Mar. 31, 2021

(65) Prior Publication Data

US 2022/0029911 A1     Jan. 27, 2022

(30) Foreign Application Priority Data

Jul. 27, 2020   (IN) .............................. 202041032166

(51) Int. Cl.
*H04L 45/50*       (2022.01)
*H04L 12/46*       (2006.01)
(Continued)

(52) U.S. Cl.
CPC ........ *H04L 45/507* (2013.01); *H04L 12/4633* (2013.01); *H04L 45/04* (2013.01);
(Continued)

(58) Field of Classification Search
CPC ......... H04L 45/74; H04L 45/44; H04L 45/24; H04L 12/4633; H04L 45/507;
(Continued)

(56) References Cited

U.S. PATENT DOCUMENTS 9,467,478 B1 *  10/2016  Khan ................... H04L 63/0272
10,880,210 B2 *  12/2020  Pianigiani ............... H04L 45/64
(Continued)

FOREIGN PATENT DOCUMENTS

| WO | WO-2008089305 A2 * | 7/2008 | ......... H04L 12/4625 |
| WO | WO-2012152230 A1 * | 11/2012 | ............. H04L 45/04 |
| WO | WO-2017134537 A1 * | 8/2017 | ............. H04L 45/74 |

OTHER PUBLICATIONS

Mobility label based network: Support for mobility using MPLS and Multi-Protocol BGP Oleg Berzin;Afshin Daryoush 2008 IEEE Radio and Wireless Symposium Year: 2008 | Conference Paper | Publisher: IEEE (Year: 2008).*

(Continued)

*Primary Examiner* — Djenane M Bayard
(74) *Attorney, Agent, or Firm* — Shumaker & Sieffert, P.A.

(57) ABSTRACT

Techniques are described for using route target constraint to filter routes advertised to a node in a seamless Multiprotocol Label Switching (MPLS) network. For example, a first router of a first network may generate a first border gateway protocol (BGP) message to advertise routing information for a first node of the first network, the first BGP message indicating a transport class and specifying an address-specific route target, the transport class comprising one or more tunnels to the first node that share common characteristics. In response to receiving a second BGP message originated by second node of a second network, the second BGP message comprising the address-specific route target, the first router sends the first BGP message to a second router of the second network for sending to the second node to cause the second node to import the routing information.

18 Claims, 5 Drawing Sheets

(51) Int. Cl.
  *H04L 45/02* (2022.01)
  *H04L 45/24* (2022.01)
  *H04L 45/44* (2022.01)
  *H04L 45/74* (2022.01)
(52) U.S. Cl.
  CPC .............. *H04L 45/24* (2013.01); *H04L 45/44* (2013.01); *H04L 45/74* (2013.01)
(58) Field of Classification Search
  CPC . H04L 45/50; H04L 12/4641; H04L 63/0876; H04L 45/66
  USPC ........................................................ 709/238
  See application file for complete search history.

(56) References Cited

U.S. PATENT DOCUMENTS

| | | | | |
|---|---|---|---|---|
| 2008/0170578 | A1* | 7/2008 | Ould-Brahim | H04L 12/4641 370/401 |
| 2015/0085638 | A1* | 3/2015 | Li | H04L 45/02 370/217 |
| 2016/0142284 | A1* | 5/2016 | Ma | H04L 45/50 370/225 |
| 2017/0093703 | A1* | 3/2017 | Natu | H04L 12/4633 |
| 2017/0230287 | A1* | 8/2017 | Hall | H04L 69/22 |
| 2018/0131604 | A1* | 5/2018 | Zhou | H04L 45/44 |

OTHER PUBLICATIONS

A Flexible and Lightweight BGP Route Injector to Multiple Peers Jialiang Pan;Yaoqing Liu 2015 IEEE 14th International Symposium on Network Computing and Applications Year: 2015 | Conference Paper | Publisher: IEEE (Year: 2015).*
A Flexible and Lightweight BGP Route Injector to Multiple Peers Jialiang Pan;Yaoqing Liu 2015 IEEE 14th International Symposium on Network Computing and Applications Year: 2015 | Conference Paper | Publisher: IEEE (Year: 2015) (Year: 2015).*
BGP route reflection revisited Jong Han Park; Ricardo Oliveira; Shane Amante; Danny Mcpherson; Lixia Zhang IEEE Communications Magazine Year: 2012 | vol. 50, Issue: 7 | Magazine Article | Publisher: IEEE (Year: 2012).*
A novel self-routing address scheme for all-optical packet-switched networks with arbitrary topologies X.C. Yuan • V.O.K. Li • C.Y. Li • P.K.A. Wai, Published in: Journal of Lightwave Technology (vol. 21, Issue: 2, pp. 329-339) Publication Date: Feb. 1, 2003 (Year: 2003).*
Vairavakkalai et al., "BGP Classful Transport Planes; draft-kaliraj-idr-bgp-classful-transport-planes-07", IETF: Internet-Draft, Feb. 15, 2021, 30 pp.
Filsfils et al., "Segment Routing Architecture" IETF: RFC 8402, https://www.rfc-editor.org/rfc/pdfrfc/rfc8402.txt.pdf, Jul. 2018, 32 pp.
Filsfils et al., "Segment Routing Use Cases; draft-filsfils-spring-segment-routing-use-cases-01", IETF; Internet-Draft, Oct. 21, 2014, 35 pp.
Filsfils et al., Segment Routing Policy Architecture; draft-ietf-spring-segment-routing-policy06, IETF; Internet-Draft, Dec. 14, 2019; 35 pp.
Previdi et al., "Source Packet Routing in Networking (SPRING) Problem Statement and Requirements" IETF, May 2016, 19 pp.
Bashandy et al., "Segment Routing with MPLS data plane: draft-ietf-spring-segment-routing-mpls-18" IETF, Dec. 9, 2018, 38 pp.
Leymann et al., "Seamless MPLS Architecture; draft-ietf-mpls-seamless-mpls-07", IETF, Internet-Draft, Jun. 28, 2014, 42 pp.
Vairavakkalai et al., "BGP Classful transport Planes: draft-kaliraj-idr-bgp-classful-transport-planes-00", IETF, Internet-Draft, May 7, 2020, 14 pp.
Rosen et al., "BGP/MPLS IP Virtual Private Networks (VPNs)", IEFT, https://www.rfc-editor.org/rfc/pdfrfc/rfc4364.txt.pdf, Feb. 2006, 47 pp.
Sangli et al., "BGP Extended Communities Attribute", IEFT, https://www.rfc-editor.org/rfc/pdfrfc/rfc4360.txt.pdf; Feb. 2006, 12 pp.
Moy, "OSPF Version 2", IEFT, https://www.rfc-editor.org/rfc/pdfrfc/rfc2328.txt.pdf, Apr. 1998, 244 pp.
Coltun et al., "OSPF for IPv6",Network Working Group, RFC 5340, Jul. 2008, 95 pgs.
Sheth et al., "OSPF Hybrid Broadcast and Point-to-Multipoint Interface Type", IETF, Jan. 2013, 9 pp.
Lindum et al., "OSPFv3 LSA Extendibility: draft-acee-ospfv3-lsa-extend-01.txt", IEFT: Internet-Draft, Jul. 15, 2013, 27 pgs.
Oran "OSI IS-IS Intra-domain Routing Protocol" Network Working Group, RFC 1142, Feb. 1990, 157 pgs.
Li et al., "IGP Requirements for Traffic Engineering with MPLS," Network Working Group Internet Draft, draft-li-mpls-gp-te-00.txt, Feb. 1999, 6 pp.
Rekhter et al., "A Border Gateway Protocol 4 (BGP-4)," RFC 4271, Network Working Group, Jan. 2006, 104 pp.
Cisco, "Multiprotocol Label Switching (MPLS) Configuration Guide, Cisco IOS XE Gibraltar 16.12.x (Catalyst 9600 Switches)", Cisco, Jul. 31, 2019, 218 pp.
U.S. Appl. No. 16/836,457, filed Mar. 31, 2020, by Vairavakkalai et al.

* cited by examiner

ROUTE TARGET CONSTRAINT TO FILTER ROUTES ADVERTISED TO A NODE IN A SEAMLESS MPLS OR SEAMLESS SR NETWORK

This application claims the benefit of India Provisional Patent Application No. 202041032166, filed Jul. 27, 2020, the contents of which is incorporated by reference herein in its entirety.

TECHNICAL FIELD

The disclosure relates to computer networks and, more particularly, to filtering routes advertised within computer networks.

BACKGROUND

A computer network is a collection of interconnected computing devices that exchange data and share resources. In a packet-based network the computing devices communicate data by dividing the data into small blocks called packets, which are individually routed across the network from a source device to a destination device. The destination device extracts the data from the packets and assembles the data into its original form.

Certain devices (otherwise referred to as nodes) within the network, such as routers, use routing protocols to exchange and accumulate topology information that describes available routes through the network. This allows a router to construct its own routing topology map of the network. Upon receiving an incoming data packet, the router examines information within the packet and forwards the packet in accordance with the accumulated topology information.

Packet-based networks increasingly utilize label switching protocols for traffic engineering and other purposes. Multi-Protocol Label Switching (MPLS) is a mechanism used to engineer traffic patterns within Internet Protocol (IP) networks according to the routing information maintained by the routers in the networks. By utilizing MPLS protocols, such as the Label Distribution protocol (LDP), the Resource Reservation Protocol (RSVP) with Traffic Engineering extensions (RSVP-TE), or the Segment Routing (SR) extension, label switching routers can forward traffic along a particular path through a network to a destination device, i.e., a Label Switched Path (LSP), using labels prepended to the traffic. An LSP defines a distinct path through the network to carry MPLS packets from the source device to a destination device. Using MPLS protocol, each router along an LSP allocates a label in association with the destination and propagates the label to the closest upstream router along the path. Routers along the path add (push), remove (pop) or swap the labels and perform other MPLS operations to forward the MPLS packets along the established path.

In some examples, an MPLS network may implement a seamless MPLS architecture that provides a highly flexible and scalable architecture to integrate multiple networks (e.g., access, aggregation, and core networks) into a single MPLS domain. For example, an MPLS network may include access, aggregation, and core networks, each operating in a different MPLS domain. Seamless MPLS removes domain boundaries and extends the topology into a single MPLS domain such that services may be deployed faster between any two points in the end-to-end MPLS network. Moreover, seamless MPLS helps scale the MPLS network limiting the propagation of routes to nodes that request for the routes. Additional examples of seamless MPLS is described in N. Leymann, Ed., et al., "Seamless MPLS Architecture," draft-ietf-mpls-seamless-mpls-07, Internet-Draft, Jun. 28, 2014, the entire contents of which is incorporated by reference herein.

SUMMARY

In general, this disclosure describes techniques for using a route target extended community or constraint to filter routes advertised to a node in a seamless MPLS network. For example, a network may include access networks connected by a core network, each network operating in different MPLS domains. An access node may have services configured that necessitate reachability to one or more remote access nodes. In some examples, the network may implement a seamless MPLS architecture that integrates the multiple networks into a single MPLS domain. Access nodes of a seamless MPLS architecture may establish end-to-end LSPs to connect access nodes of different access networks. For example, in a seamless MPLS architecture, network devices exchange loopback addresses and MPLS label bindings for LSPs across the entire MPLS network using BGP, such as BGP classful transport, as described in K. Vairavakkalai, et al., "BGP Classful Transport Planes," Internet-Draft, draft-kaliraj-idr-bgp-classful-transport-planes-07, Feb. 15, 2021, the entire contents of which is incorporated by reference herein.

To provide scalability in a seamless MPLS architecture, access nodes are limited in the amount of stored labeled BGP routes. For example, access nodes may typically use LDP Downstream-on-Demand (DoD) label advertisement to request a downstream label switched router (e.g., area border router (ABR)) for a label binding when needed. That is, rather than learning and storing all label bindings for all possible loopback addresses within the entire seamless MPLS network, the access node uses LDP DoD to request only the label bindings corresponding to the loopback addresses of egress nodes (e.g., remote access nodes) to which it has services configured.

In some examples, network devices in a seamless MPLS network may employ segment routing techniques, such as by using a Source Packet Routing in Networking (SPRING) paradigm, to establish end-to-end segment routing LSPs. A seamless MPLS network employing segment routing techniques is referred to herein as a seamless SR network. In seamless SR networks, LDP is not used, and thus an access node is unable to use LDP DoD label advertisements to request label binding information from its downstream label switched router (e.g., ABR).

In accordance with the techniques described in this disclosure, an access node in a seamless MPLS network, such as a seamless SR network, may use a route target extended community or constraint to request label binding information from its downstream ABR. As one example, a first ABR for a first access node of a first access network may store routing information (e.g., a loopback address and MPLS label bindings) to reach the first access node. The first ABR may generate and hold one or more BGP messages, such as BGP classful transport (BGP-CT) messages, to advertise reachability information (otherwise referred to herein as "routing information") for the first access node for at least one transport class. As further described in this disclosure, a first BGP message generated by the first ABR may comprise the routing information for the first access node, and an address-specific route target to cause a second access node of a second access network to import the routing information for the first access node for at least one transport class of one or more transport classes associated with the first access node. As one specific example, the first BGP message generated by the first ABR includes routing information for the first access node for at least one transport class and an address-specific route target encoded with the at least one transport class associated with the first access node.

When a second access node wants to receive reachability information for the first access node associated with the at least one transport class, the second access node generates a second BGP message (e.g., BGP-CT message) comprising a route target extended community or constraint encoded with the address-specific route target to request label binding information from its downstream ABR. For example, the BGP message generated by the second access node may comprise a route target extended community or constraint encoded with the address-specific route target comprising an address (e.g., loopback address or prefix range) of the first access node and at least one transport class associated with the first access node. More specifically, the BGP message generated by the second access node may include a route target extended community or constraint encoded with the address-specific route target comprising a global administrator field encoded with the loopback address of the first access node and a link administrator field encoded with the at least one transport class value associated with the first access node.

The second access node sends, to a second ABR, the second BGP message, which advertises the second BGP message including the address-specific route target to BGP neighbors, such as the first ABR. In response to receiving the second BGP message including the address-specific route target, the first ABR sends the first BGP message generated by the first ABR to the second ABR. The first BGP message, which comprises the routing information for the first access node for the at least one transport class and comprises the address-specific route target, causes the second access node to import the routing information for the first access node for the at least one transport class. In this way, the second access node may use a route target extended community or constraint to filter routes advertised to a node in a seamless MPLS segment routing network.

In one example, the techniques in this disclosure describe a method comprising generating, by a first router of a first network, a first border gateway protocol (BGP) message to advertise routing information for a first node of the first network, the first BGP message indicating a transport class and specifying an address-specific route target, the transport class comprising one or more tunnels to the first node that share common characteristics; receiving, by the first router from a second router of a second network, via a core network connecting the first network and the second network and implementing a seamless Multiprotocol Label Switching (MPLS) network with the first network and the second network, a second BGP message originated by a second node of the second network, the second BGP message comprising the address-specific route target; and sending, by the first router in response to receiving the second BGP message comprising the address-specific route target, the first BGP message to the second router for sending to the second node to cause the second node to import the routing information.

In another example, the techniques in this disclosure describe a method comprising: sending, by a first node of a first network and to a first router of the first network, a first border gateway protocol (BGP) message to request for routing information for a second node of a second network, the BGP message comprising an address-specific route target; receiving, by the first router from the second router of the second network, via a core network connecting the first network and the second network and implementing a seamless Multiprotocol Label Switching (MPLS) network with the first network and the second network, a second BGP message originated by the second node of the second network, the second BGP message indicating a transport class and specifying the address-specific route target, the transport class comprising one or more tunnels to the second node that share common characteristics; importing, by the first node in response to receiving the second BGP message comprising the address-specific route target, the routing information for the second node of the second network; and forwarding, by the first node and based on the routing information for the second node, network traffic to the second node via a tunnel associated with the transport class.

In yet another example, the techniques in this disclosure describe a first router connected to a first network and a core network, the first router comprising: one or more processors operably coupled to a memory, wherein the one or more processors are configured to: generate a first border gateway protocol (BGP) message to advertise routing information for a first node of the first network, the first BGP message indicating a transport class and specifying an address-specific route target; receive, from a second router of a second network, the transport class comprising one or more tunnels to the first node that share common characteristics, via the core network connecting the first network and the second network and implementing a seamless Multiprotocol Label Switching (MPLS) network with the first network and the second network, a second BGP message originated by a second node of the second network, the second BGP message comprising the address-specific route target; and send, in response to receiving the second BGP message comprising the address-specific route target, the first BGP message to the second router for sending to the second node to cause the second node to import the routing information.

The details of one or more examples are set forth in the accompanying drawings and the description below. Other features, objects, and advantages will be apparent from the description, drawings, and from the claims.

DETAILED DESCRIPTION

Figure 1A:
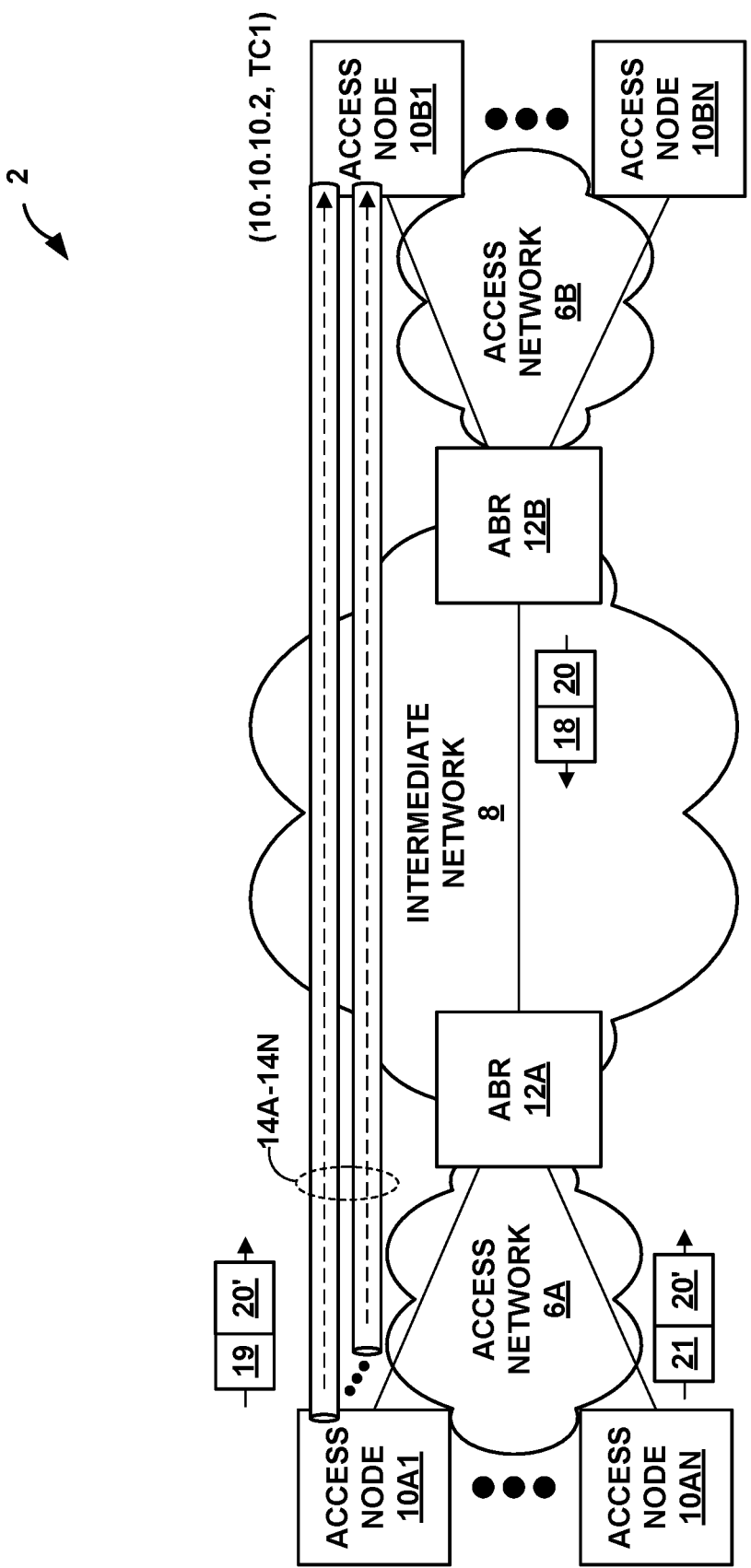
FIG. 1A is a block diagram illustrating an example network that uses route target constraint to filter routes advertised to a node in a seamless MPLS network, in accordance with techniques described in this disclosure.

FIG. 1A is a block diagram illustrating an example network system 2 that uses route target constraint to filter routes advertised to a node in a seamless MPLS network, in accordance with techniques described in this disclosure. Network system 2 includes an intermediate network 8, which is referred to herein as a "core" or "backbone" network, to interconnect networks of different administrative domains, e.g., access networks 6A-6B (collectively, "access networks 6"). In the example of FIG. 1A, network system 2 may be partitioned into domains, such as Autonomous Systems (AS) or Interior Gateway Protocol (IGP) areas or levels. For example, network system 2 may be partitioned into one area including network devices of intermediate network 8, and another area including network devices of access networks 6.

Intermediate network 8 may represent a service provider network that is owned and operated by a service provider, which is usually large telecommunications entity or corporation. Intermediate network 8 represents an L3 computer network, where reference to a layer followed by a number refers to a corresponding layer in the Open Systems Interconnection (OSI) model. Intermediate network 8 is a L3 network in the sense that it natively supports L3 operations as described in the OSI model. Common L3 operations include those performed in accordance with L3 protocols, such as the Internet protocol (IP). L3 is also known as a "network layer" in the OSI model and the "IP layer" in the TCP/IP model, and the term L3 may be used interchangeably with the and "network layer" and "IP" throughout this disclosure.

Intermediate network 8 may be coupled to one or more networks administered by the provider of intermediate network 8 or other providers, and may thus form part of a large-scale public network infrastructure, e.g., the Internet. Intermediate network 8 may provide computing devices within access networks 6 with access to the Internet, and may allow the computing devices within the access networks to communicate with each other.

Intermediate network 8 may implement Multi-Protocol Label Switching (MPLS) forwarding and in such instances may be referred to as an MPLS network or MPLS backbone. Although not shown in the example of FIG. 1A, intermediate network 8 may include one or more core transit routers (otherwise referred to as "provider (P) routers" or "core routers") that provide devices of access networks 6 with access to services provided by devices in the IP/MPLS intermediate network 8.

Access networks 6 include one or more access nodes (ANs) (otherwise referred to as "edge switches" or "service nodes"), such as ANs 10A1-10AN (collectively, "ANs 10A") and ANs 10B1-10BN (collectively, "ANs 10B"). ANs 10A and ANs 10B may collectively be referred to as "ANs 10." In the example network of FIG. 1A, access network 6A includes "ANs 10A" and access network 6B includes "ANs 10B". In some examples, ANs 10 may represent routers, switches, aggregation devices (AD), or other types of network device capable of performing edge operations for access networks 6.

In the example of FIG. 1A, some of ANs 10 may be source devices that operate to ingress or otherwise inject or source network packets into access networks 6. Some of ANs 10 may be destination devices that operate to egress or otherwise drain network packets out of access networks 6. For example, AN 10A1 may be coupled to one or more customer devices (not shown) with access to access network 6A and is configured to ingress packets received from the one or more customer devices into access network 6A. Similarly, AN 10B1 may be coupled to one or more customer devices (not shown) with access to access network 6B and is configured to egress packets from access network 6B to the one or more customer devices. ANs 10 may both ingress and egress network packets.

Network system 2 also includes routers, such as area border routers (ABRs) 12A-12B (collectively, "area border routers 12"), that provide connectivity between access networks 6 and intermediate network 8. Although illustrated as connecting access networks 6 and intermediate network 8, ABRs 12 may provide access networks with connectivity to intermediate network 8 via one or more aggregation networks (not shown) that aggregate traffic from one or more access networks. In this example, ABR 12A provides connectivity between access network 6A and intermediate network 8. Similarly, ABR 12B provides connectivity between access network 6B and intermediate network 8.

Although additional network devices are not shown for ease of explanation, it should be understood that network system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Moreover, although the elements of network system 2 are illustrated as being directly coupled, it should be understood that one or more additional network elements may be included along any of the illustrated links such that the network elements of network system 2 are not directly coupled.

ANs 10 may maintain routing information that describes available routes through network system 2. Upon receiving an incoming packet, each of ANs 10 examines information within the packet and forwards the packet in accordance with the routing information. In order to maintain an accurate representation of network system 2, ANs 10 exchange routing information, e.g., bandwidth availability of links, with local ABRs in accordance with a defined routing protocol, such as an Interior Gateway Protocol (IGP) or Border Gateway Protocol (BGP). For example, each of the ANs may use a link-state routing protocol, such as the Open Shortest Path First (OSPF) protocol or the Intermediate-System to Intermediate-System (IS-IS) protocol, to exchange link-state routing information to learn the topology within an access network domain.

In some examples, ANs 10 may use segment routing techniques, e.g., the Source Packet Routing in Networking (SPRING) paradigm, to advertise LSPs (otherwise referred to herein as "tunnels"). Segment routing is a control-plane architecture that enables an ingress node to steer a packet through a specific set of nodes and links in a network using a list of segment identifiers. For example, segment routing techniques are used to configure labels for paths from an ingress node, e.g., AN 10A1 to an egress node, e.g., AN 10B1. Segment routing allows routers to advertise single or multi-hop LSPs such as a segment routing LSP. In other words, segment routing may advertise two types of network segments. First, a one-hop tunnel that carries packets over a specific link between two nodes, irrespective of the link cost (hereinafter referred to as "adjacency segments"). Second, a multi-hop tunnel using shortest path links between two specific nodes or to a specific prefix (hereinafter referred to as "prefix segments").

For segment routing within prefix segments, the "path" information is disseminated between the routers as part of the IGP link state information for the domain. Network devices are able to steer packets through a controlled set of instructions, called segments, by prepending one or more segment identifiers (SIDs) (otherwise referred to as "labels") to the packets. In other words, an ingress network device can steer a packet through a desired set of nodes and/or links by prepending the packet with an appropriate combination of prefix SIDs (otherwise referred to as "node labels") and/or adjacency SIDs (otherwise referred to as "adjacency labels"), respectively. The combination of node labels and/or adjacency labels is referred to as a label stack or segment list of segment identifiers. To forward a packet through a network, network devices that implement segment routing may push, pop, or swap one or more labels in a label stack that is applied to the packet as it is forwarded through the network. In this way, segment routing allows network devices to enforce a flow through any topological path and/or service chain while maintaining per-flow state only at the ingress node to the segment routing domain.

One potential advantage of segment routing may be that the segment routing architecture can be directly applied to the MPLS data plane with no change in the forwarding plane. A network administrator need only allocate SIDs to particular routers and the segment routing IGP control-plane automatically builds the required MPLS forwarding constructs from a router to any other router. Segment routing is further described in Filsfils, et al., "Segment Routing Architecture, IETF RFC 8402, July 2018, while Segment Routing use cases are described in Filsfils, et al., "Segment Routing Use Cases," IETF Internet-Draft draft-Filsfils-spring-segment-routing-use-cases-01, Oct. 21, 2014, each of which is incorporated herein by reference. Further details regarding SPRING are found in (1) Filsfils, et al., "Segment Routing Policy Architecture," IETF Internet-Draft-draft-ietf-spring-segment-routing-policy06, Dec. 14, 2019; (2) Previdi, et al., "Source Packet Routing in Networking (SPRING) Problem Statement and Requirements," IETF RFC 7855, May 2016, and (3) Bashandy, et al., "Segment Routing with MPLS data plane," IETF RFC 826260, December 2019, each of which is incorporated herein by reference. Where a label switched path (LSP) is used for transport, the LSP may be referred to herein as a "tunnel."

In example of FIG. 1A, network system 2 may implement a seamless MPLS architecture. In a seamless MPLS network, the multiple domains of network system 2 may be integrated into a single, seamless MPLS domain. As described above, network system 2 is divided into multiple areas such as a core area (e.g., intermediate network 8), access areas (e.g., access networks 6), and aggregation areas (not shown), wherein each of these areas have different IGPs. Without seamless MPLS, the IGP prefixes of one area cannot be distributed to another area and thus an end-to-end tunnel cannot be established, which affects the scalability of the network. With seamless MPLS, end-to-end tunnels may be established using BGP instead of IGP to forward loopback addresses of ANs 10, therefore providing greater scalability for the network as it eliminates the need to install IGP prefixes of one domain in another domain. Additional examples of seamless MPLS is described in N. Leymann, Ed., et al., "Seamless MPLS Architecture," draft-ietf-mpls-seamless-mpls-07, Internet-Draft, Jun. 28, 2014, the entire contents of which is incorporated by reference herein. As one example, a seamless MPLS architecture may be implemented for the segment routing network (also referred to herein as a "seamless SR network"), as described in the example of FIG. 1A.

Network system 2 may include one or more MPLS tunnels, such as tunnels 14A-14N (collectively, "tunnels 14"). Tunnels 14 can be created using a signaling and label distribution protocol, such as RSVP-TE, SPRING, etc. Tunnels 14 may support a network service route between end points, e.g., one of ANs 10A and one of ANs 10B. Each of tunnels 14 may traverse intermediate network 8 via one or more hops. Multiple tunnels may exist between the same pair of end points (e.g., AN 10A1 and AN 10B1) such that a packet may travel between AN 10A1 and AN 10B1 via any one or more tunnels 14 in various different ways according to their respective characteristics. For example, each of tunnels 14 may present different characteristics in terms of bandwidth, latency, high availability (or, in other words, operational time characteristics), etc.

Tunnels 14 may be assigned to a service-specific group referred to herein as "transport class." In other words, a transport class is a set of transport tunnels that share certain characteristics. For example, a "Gold" transport class may comprise tunnels that traverse the shortest path with fast re-route protection, a "Silver" transport class may comprise tunnels that traverse shortest paths without protection, a "To NbrAS Foo" transport class may hold tunnels that exit to neighboring autonomous system "Foo," and so on. In some examples, transport classes may be mapped to segment routing traffic engineering colors. For example, services may correspond to one or more "service colors" and tunnels may correspond to one or more "tunnel colors." Colors, in some cases, are generic labels which identify a respective service or tunnel as being a part of a common type. For example, each tunnel that includes the color "blue" may be of a first type and each tunnel that includes the color "red" may be of a second type. As non-limiting examples, tunnels assigned to a particular color may have one or more characteristics in common, such as a similar latency, bandwidth, packet drop rate, address family (e.g., IPv4 or IPv6), software license agreement (SLA) requirements, quality requirement, tunneling protocol, path computation algorithm, virtual topology, virtual slice, etc. The use of "color" to group tunnels is referred to herein as "tunnel coloration." In the example of FIG. 1A, transport tunnel 14 may be assigned to a transport class ("first transport class"), and another transport tunnel (e.g., tunnels 16 in FIG. 1B) may be assigned to a different transport class ("second transport class").

An administrator may configure transport classes within ANs 10 and ABRs 12. The creation of a transport class instantiates a transport routing information base (RIB) and a transport routing instance. For example, network devices of network system 2 model a transport class as transport RIB, which comprises routes (also referred to herein as a "tunnel route," "transport route," or "ingress route") of a certain class. Network devices may resolve service routes over an intended transport class by using the corresponding transport RIB for finding next hop reachability.

ABRs 12 may advertise the tunnel routes using BGP messages, such as BGP classful transport (BGP-CT) messages, to disseminate tunnel routes across administrative domains. In some examples, a BGP transport address family, called "Transport VPN," that uses BGP-Virtual Private Network (VPN) technology and follow Network Layer Reachability Information (NLRI) encoding is used to disseminate service-specific information across administrative domains. In this way, a router of a different administrative domain that receives the tunnel routes via BGP-CT messages may also associate the service routes to the appropriate transport class. Additional examples of BGP-CT and transport classes are further described in K. Vairavakkalai, et al., "BGP Classful transport Planes," Internet-Draft, draft-kaliraj-idr-bgp-classful-transport-planes-00, May 7, 2020, and U.S. patent application Ser. No. 16/836,457, "Service-based Transport Classes for Mapping Services to Tunnels," filed Mar. 30, 2020, the entire contents of both of which are incorporated by reference herein.

Seamless MPLS also provides scalability in that MPLS label binding (or simply "labels") distribution is reduced. For example, rather than each of ANs 10A learning and storing all labels for all possible loopback addresses of egress nodes within the seamless MPLS network, labels are distributed to the access nodes that specifically request for the labels corresponding to loopback addresses of egress nodes to which it has services configured. In this way, ANs may store a limited number of services configured to a limited number of destinations. Typically, in non-SR networks implementing seamless MPLS architecture, LDP Downstream on Demand (DoD) is used by access nodes to request for labels from a local area border router. However, in seamless SR networks, LDP is not used, and thus LDP DoD cannot be used to request labels.

In accordance with the techniques described in this disclosure, network devices may use a route target extended community or constraint to filter routes advertised to a node in a seamless MPLS network. In the example of FIG. 1A, an administrator may configure AN 10B1 and ABR 12B to create a transport class, e.g., a first transport class TC1, which instantiates an associated transport RIB and a transport routing instance. For example, ABR 12B may receive a route advertisement (or statically configure a route) with a loopback address of AN 10B1 (e.g., 10.10.10.2) and an MPLS label binding (e.g., segment identifier) to reach AN 10B1. An administrator may configure ABR 12B to classify a tunnel, such as tunnel 14A, to AN 10B1 into the first transport class TC1, which causes the tunnel's ingress routes to be installed in the corresponding transport RIB.

ABR 12B may then use BGP to generate and hold BGP messages to advertise the routes stored in the transport RIB. For example, ABR 12B may construct a BGP message 18, e.g., BGP-CT update message, to advertise reachability information for AN 10B1 for the first transport class TC1. For instance, as further described in this disclosure, ABR 12B may construct BGP message 18 with a BGP NLRI encoded with the loopback address (10.10.10.2) of AN 10B1 and the first transport class TC1 to identify the route belongs to the first transport class TC1. For example, BGP message 18 may include an address-specific route target (RT) extended community 20 encoded with the first transport class TC1. More specifically, the address-specific RT extended community 20 may comprise a global administrator field of the RT encoded with the loopback address of AN 10B1 and a local administrator field of the RT encoded with the first transport class TC1.

ABR 12B may construct BGP message 18, but does not send the BGP message until it receives from a BGP peer a BGP message with a route target extended community or constraint including the address-specific RT. For example, an access node, e.g., AN 10A1, may request for reachability information of AN 10B1 for the first transport class TC1 by sending a BGP message 19, e.g., BGP-CT message, with a route target extended community or constraint 20' including the address-specific RT 20. For instance, AN 10A1 may send, to its local ABR, e.g., ABR 12A, BGP message 19 with route target extended community or constraint 20' including the address-specific RT 20 comprising the loopback address (10.10.10.2) of AN 10B1 and the first transport class TC1. As one particular example, the route target extended community or constraint 20' including the address-specific RT 20 comprises a global administrator field encoded with the loopback address (10.10.10.2) of AN 10B1 and a local administrator field encoded with the first transport class TC1. In response to receiving BGP message 19 with route target extended community or constraint 20', ABR 12A sends BGP message 19 with route target extended community or constraint 20' to BGP peers, e.g., ABR 12B.

In response to receiving BGP message 19 with route target extended community or constraint 20', ABR 12B may determine that route target extended community or constraint 20' includes the address-specific RT 20. For example, ABR 12B may determine that the global administrator field is encoded with the loopback address of AN 10B1 and the local administrator field is encoded with the first transport class TC1. In response, ABR 12B sends BGP message 18 to ABR 12A to advertise reachability information for AN 10B1 associated with the first traffic class TC1. As described above, BGP message 18 includes the loopback address of AN 10B1 within the BGP NLRI, the MPLS label bindings of AN 10B1 (e.g., segment identifier of AN 10B1), and an address-specific RT 20 encoded with the first transport class TC1 (e.g., wherein the global administrator field of the RT is encoded with the loopback address of AN 10B1 and the local administrator field of the RT is encoded with the first transport class TC1).

In response to receiving BGP message 18, ABR 12A may send BGP message 18 to AN 10A1 since AN 10A1 sent the BGP message 19 with the route target extended community or constraint 20'. In response to receiving the BGP message 18, AN 10A1 determines that BGP message 18 includes the address-specific RT 20, and imports the route (e.g., storing the route in its transport RIB). AN 10A1 may use the imported routing information for AN 10B1 to forward network traffic to AN 10B1 via a tunnel associated with the first transport class TC1. In this way, AN 10A1 may use the techniques described in this disclosure to request only the label bindings corresponding to the loopback addresses of egress nodes to which it has services configured (e.g., AN 10B1) without learning and storing all label bindings for all possible loopback addresses within the entire seamless MPLS network.

In some examples, if ABR 12A has already received BGP message 18 (e.g., in response to receiving BGP message 19 with the address-specific RT 20), ABR 12A may send the BGP message 18 in response to receiving additional BGP messages with the address-specific RT 20. For example, AN 10AN may also request for reachability information for AN 10B1 associated with the first transport class TC1. In this example, AN 10AN may send, to its local ABR, e.g., ABR 12A, a BGP message 21 with a route target extended community or constraint 20' including the address-specific RT 20. If ABR 12A has already received the BGP message with the address-specific RT 20, such as in the example described above, ABR 12A may send BGP message 18 to AN 10AN. If ABR 12A has not previously received the BGP message with the address-specific RT 20, then ABR 12A sends BGP message 21 with the address-specific RT 20 to BGP peers, e.g., ABR 12B.

The techniques described in this disclosure may provide one or more technical advantages that realize a practical application. For example, by sending a BGP message with a route target extended community or constraint encoded with an address-specific route target that comprises a global administrator field of a route target encoded with a loopback address of the access node and a local administrator field of the route target encoded with a transport class associated with the access node, ABRs may control the propagation of BGP routes in a seamless SR network, which improves scalability by reducing the amount of routes stored within access nodes.

Figure 1B:
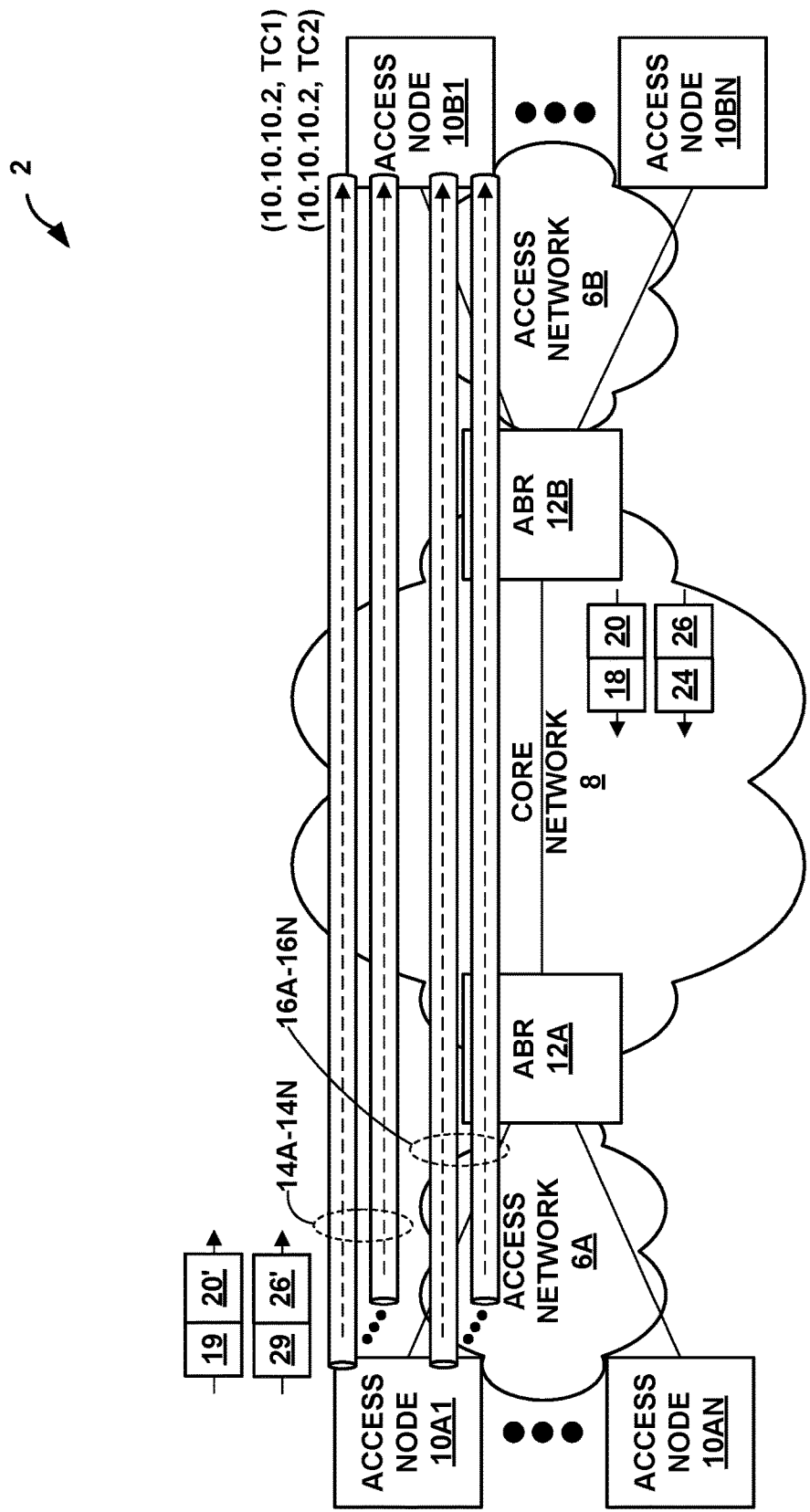
FIG. 1B is a block diagram illustrating another example instance of the network that uses route target constraint to filter routes advertised to a node in a seamless MPLS network, in accordance with techniques described in this disclosure.

FIG. 1B is a block diagram illustrating another example instance of the network that uses route target extended community or constraint to filter routes advertised to a node in a seamless segment routing network, in accordance with techniques described in this disclosure. Network system 2 of FIG. 1B is similar to the network system 2 of FIG. 1A, except as described below.

In the example of FIG. 1B, AN 10B1 may be assigned to a plurality of transport classes. For example, an administrator may configure AN 10B1 and ABR 12B to create a first transport class TC1 (similarly as described in the example of FIG. 1A) and a second transport class TC2, which instantiates an associated transport RIB and a transport routing instance for each of the transport classes created. Although the example in FIG. 1B illustrates only two transport classes, AN 10B1 may be assigned to any number of transport classes.

In this example, ABR 12B may receive a route advertisement (or statically configure a route) with a loopback address of AN 10B1 (e.g., 10.10.10.2) and an MPLS label binding (e.g., segment identifier) to reach AN 10B1. An administrator may configure ABR 12B to classify a first set of tunnels, such as tunnels 14, to AN 10B1 into the first transport class TC1, and a second set of tunnels, such as tunnels 16A-16N ("tunnels 16"), to AN 10B1 into the second transport class TC2.

ABR 12B may then use BGP to generate and hold one or more BGP messages to advertise the routes stored in the transport RIB. For example, ABR 12B may construct a first respective BGP message, e.g., BGP message 18 (as similarly described in the example of FIG. 1A), to advertise reachability information for AN 10B1 associated with the first transport class TC1, and a second respective BGP message, e.g., BGP message 24, to advertise reachability information for AN 10B1 associated with the second transport class TC2. For instance, in addition to constructing BGP message 18 for AN 10B1 associated with the first transport class TC1, ABR 12B may construct BGP message 24 with a BGP NLRI encoded with the loopback address (10.10.10.2) of AN 10B1 and the second transport class TC2 to identify the route belongs to the second transport class TC2. For example, BGP message 24 includes an address-specific route target (RT) extended community 26 encoded with the second transport class TC2. As one particular example, the route target extended community or constraint 26' including the address-specific RT 26 comprises a global administrator field of the RT encoded with the loopback address of AN 10B1 and a local administrator field of the RT is encoded with the second transport class TC2.

ABR 12B may construct BGP messages 18 and 24, but does not send the BGP messages until it receives from a BGP peer a BGP message with a route target extended community or constraint including an address-specific RT 20 or RT 26. In some examples, AN 10A1 may request for reachability information of AN 10B1 for both first transport class TC1 and second transport class TC2. In this example, AN 10A1 may send respective BGP messages with a route target extended community or constraint that includes a respective route target. Similarly as described in the example of FIG. 1A, to request for reachability information of AN 10A1 associated with the first transport class TC1, AN 10A1 may send a BGP message 19 with a route target extended community or constraint 20' encoded with the address-specific RT 20. AN 10A1 may also send BGP message 29 with a route target extended community or constraint 26' encoded with the address-specific RT 26 to request for reachability information for AN 10A1 for the second transport class TC2. In this example, AN 10A1 may send, to its local ABR, e.g., ABR 12A, BGP message 19 including route target extended community or constraint 20' that is encoded with address-specific RT 20 (as described in the example of FIG. 1A), and send BGP message 29 including route target extended community or constraint 26' that is encoded with address-specific RT 26 encoded with the second transport class TC2 (e.g., wherein the global administrator field is encoded with the loopback address (10.10.10.2) of AN 10B1 and the local administrator field is encoded with the second transport class TC2). In response to receiving BGP message 29 with route target extended community or constraint 26', ABR 12A sends BGP message 29 with route target extended community or constraint 26' to BGP peers, e.g., ABR 12B1. In response to receiving BGP message 29 with route target extended community or constraint 26', ABR 12B may determine that route target extended community or constraint 26' includes the address-specific RT 26, where the global administrator field is encoded with the loopback address of AN 10B1 and the local administrator field is encoded with the second transport class TC2. In response, ABR 12B sends BGP message 24 to ABR 12A to advertise reachability information for AN 10B1 for the second traffic class TC2. As described above, BGP message 24 includes the loopback address of AN 10B1 within the BGP NLRI, the MPLS label bindings of AN 10B1 (e.g., segment identifier of AN 10B1), and address-specific RT 26 (e.g., wherein the global administrator field of the RT is encoded with the loopback address of AN 10B1 and the local administrator field of the RT is encoded with the second transport class TC2).

In some examples, AN 10A1 may send a single BGP message to request for reachability information of all transport classes of ANs 10B. For example, AN 10A1 may generate a single BGP message with a prefix range for all of ANs 10B.

Figure 2:
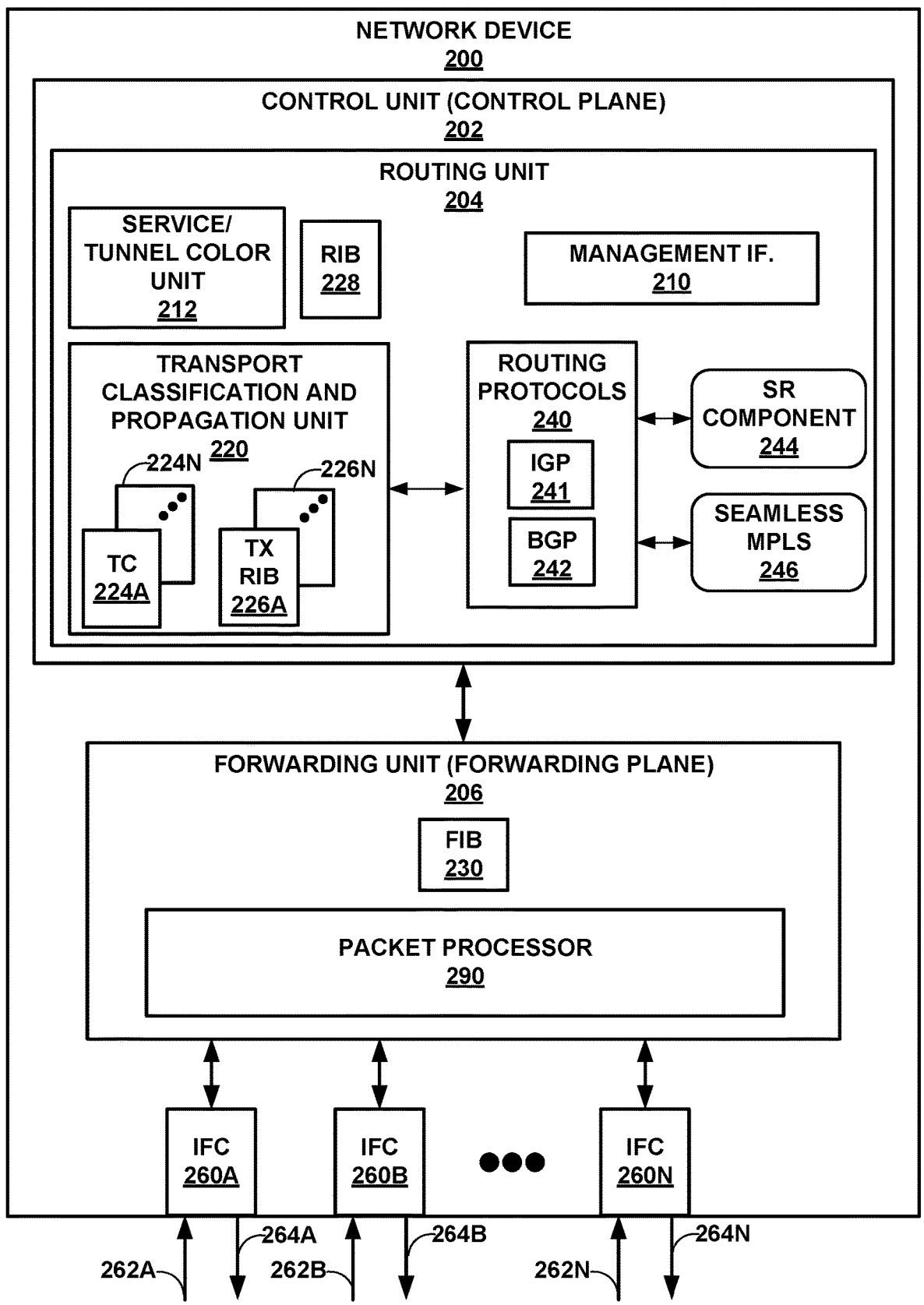
FIG. 2 is a block diagram illustrating an example of a network device, in accordance with one or more techniques described in this disclosure.

FIG. 2 is a block diagram illustrating an example of a network device 200, in accordance with one or more techniques of this disclosure. Network device 200 may represent any of access nodes 10 and area border routers 12, but may also represent any router such as a provider edge or customer edge router, or another type of network device, such as a switch.

In the example of FIG. 2, network device 200 includes interface cards 260A-260N ("IFCs 260") that receive packets via inbound links 262A-262N ("inbound links 262") and send packets via outbound links 264A-264N ("outbound links 264"). IFCs 260 are typically coupled to links 262, 264 via a number of interface ports (not shown). Inbound links 262 and outbound links 264 may represent physical interfaces, logical interfaces, or some combination thereof.

In general, network device 200 includes a control unit 202 that provides control plane functionality for the device. Control unit 202 configures and controls packet forwarding operations applied by forwarding unit 206. For example, control unit 202 determines routes of received packets and forwards the packets accordingly via IFCs 260.

Control unit 202 may be connected to forwarding unit 206 by an internal communication link. The internal communication link may include a 100 Mbps Ethernet connection, for instance. Control unit 202 configures, by sending instructions and other configuration data via the internal communication link, forwarding unit 206 to define control processing operations applied to packets received by forwarding unit 206.

Elements of control unit 202 and forwarding unit 206 may be implemented solely in software, or hardware, or may be implemented as combinations of software, hardware, or firmware. For example, control unit 202 may include one or more processors, one or more microprocessors, digital signal processors (DSPs), application specific integrated circuits (ASICs), field programmable gate arrays (FPGAs), or any other equivalent integrated or discrete logic circuitry, or any combination thereof, which execute software instructions. In that case, the various software modules of control unit 202 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of network device 200, e.g., protocols, processes, and modules. Control unit 202, in some examples, retrieves and executes the instructions from memory for these aspects.

Routing unit 204 is responsible for the maintenance of routing information to reflect the current topology of a network and other network entities to which network device 200 is connected. In particular, routing protocols periodically update routing information, e.g., stored within routing information base (RIB) 228, to reflect the current topology of the network and other entities based on routing protocol messages received by network device 200.

Routing unit 204 provides an operating environment for execution of various routing protocols 240 that may comprise software processes having instructions executed by a computing environment. Routing unit 204 is responsible for the maintenance of routing information to reflect the current topology of a network and other network entities to which network device 200 is connected. In particular, routing protocols periodically update RIB 228 with routing information to accurately reflect the topology of the network and other entities based on routing protocol messages received by network device 200. The protocols may be software processes executing on one or more processors. For example, routing unit 204 includes network protocols that operate at a network layer of the network stack, which are typically implemented as executable software instructions. RIB 228 may be in the form of a variety of data structures, such as a number of tables, link lists, radix trees, databases, flat files, or other data structures.

In the example of FIG. 2, protocols 240 may include BGP 242 to exchange link state information between or across IGP areas or domains, as described in E. Rosen, et al., "BGP/MPLS IP Virtual Private Networks (VPNs)," Request for Comments 4364, February 2006, the entire contents of which is incorporated by reference herein. BGP 242 may also include BGP extended communities, as described in S. Sangli, et al., "BGP Extended Communities Attribute," Request for Comments 4360, February 2006, the entire contents of which is incorporated by reference herein. BGP 242 may further be used to exchange transport classes, as described in K. Vairavakkalai, et al., "BGP Classful transport Planes," Internet-Draft, draft-kaliraj-idr-bgp-classful-transport-planes-00, incorporated above.

Protocols 240 may also include IGP 241 to exchange link state information within a given IGP area, and facilitate forwarding of packets or other data units between endpoint devices within the IGP area. IGP 241 may include an OSPF routing protocol in accordance with one or more of the RFC 2328, by J. Moy, entitled "OSPF Version 2," dated April 1998, RFC 5340, by R. Coltun et al. entitled "OSPF for IPv6," dated July 2008, RFC 6845, by N. Sheth et al., entitled "OSPF Hybrid Broadcast and Point-to-Multipoint Interface Type," dated January 2013, and Internet Draft for the Networking Working Group, by A. Lindem et al., entitled "OSPFv3 LSA Extendibility," dated July 2013, draft-acee-ospfv3-1sa-extend-01.txt. In some examples, IGP 241 may include an IS-IS routing protocol in accordance with RFC 1142, by D. Oran, entitled "OSI IS-IS Intra-domain Routing Protocol," dated February 1990. IGP may include traffic extensions that support traffic engineering with Multi-protocol Label Switching (MPLS), as described in Internet Draft for Networking Group, by Tony Li et al., entitled "IGP Requirements for Traffic Engineering with MPLS," dated February 1999, draft-li-mpls-igp-te-00.txt. In some examples, network device 200 may include both OSPF and IS-IS.

In this example, routing unit 204 includes a segment routing (SR) component 244 to implement segment routing techniques for IGP protocols (e.g., IS-IS and OSPF) for specifying how network device 200 may advertise node and adjacency labels. As described above, segment routing techniques may include the SPRING paradigm. As described in FIG. 1A, these node and adjacency labels may steer a packet through a controlled set of instructions, called segments, by prepending the packet with a segment routing header.

Routing unit 204 also includes a seamless MPLS component 246 to enable network device 200 to implement a seamless MPLS architecture with other devices in a multi-domain network (e.g., network system 2 of FIG. 1). Seamless MPLS component 246 enables network device 200 to establish end-to-end tunnels using BGP instead of IGP to forward loopback addresses, which eliminates the need to install IGP prefixes of one domain in another domain.

By executing the routing protocols, routing unit 204 identifies existing routes through the network and determines new routes through the network. Routing unit 204 stores routing information (e.g., in RIB 228) that includes, for example, known routes through the network.

Forwarding unit 206 may provide a data plane for processing network traffic. In this way, forwarding unit 206 may be referred to herein as a "forwarding plane." Forwarding unit 206 may receive and send data packets via interfaces of IFCs 260. Forwarding unit 206 stores forwarding information, e.g., in forwarding information base (FIB) 230, that includes destinations of output links 264. Forwarding information may be generated in accordance with the routing information stored in RIB 228.

Forwarding unit 206 includes packet processor 290 that processes packets by performing a series of operations on each packet over respective internal packet forwarding paths as the packets traverse the internal architecture of network device 200. Packet processor 290 of forwarding unit 206, for instance, includes one or more configurable hardware chips (e.g., a chipset) that, when configured by applications executing on control unit 202, define the operations to be performed by packets received by forwarding unit 206. Each chipset may in some examples represent a "packet forwarding engine" (PFE). Each chipset may include different chips each having a specialized function, such as queuing, buffering, interfacing, and lookup/packet processing. Each of the chips may represent application specific integrated circuit (ASIC)-based, field programmable gate array (FPGA)-based, or other programmable hardware logic.

Forwarding unit 206 may perform one or more operations in order to forward packets through packet processor 290. For example, forwarding unit 206 includes FIB 230. FIB 230 may be a radix tree programmed into dedicated forwarding chips, a series of tables, a complex database, a link list, a radix tree, a database, a flat file, or various other data structures. FIB 230 included in forwarding unit 206 may include lookup structures. Lookup structures may, given a key, such as an address, provide one or more values. In some examples, the one or more values may be one or more next hops. A next hop may be implemented as microcode, which when executed, performs one or more operations. One or more next hops may be "chained," such that a set of chained next hops perform a set of operations for respective different next hops when executed. Examples of such operations may include applying one or more services to a packet, dropping a packet, and/or forwarding a packet using an interface and/or interface identified by the one or more next hops.

Operations may be performed, for example, on each packet by forwarding unit 206 or other components of network device 200 to which the packet is directed prior to egress, such as one or more service cards. Packet processor 290 may process packets to identify packet properties and perform actions bound to the properties. Packet processor 290 may include forwarding path elements that, when executed, cause the packet processor to examine the contents of each packet (or another packet property, e.g., incoming interface) and on that basis make forwarding decisions, apply filters, and/or perform accounting, management, traffic analysis, and load balancing, for example. In one example, packet processor 290 arranges forwarding path elements as next hop data that can be chained together as a series of "hops" in a forwarding topology along an internal packet forwarding path for network device 200. The result of packet processing determines a manner in which a packet is forwarded or otherwise processed by packet processor 290 of forwarding unit 206 from its input interface on one of IFCs 260 to, at least in some cases, its output interface on one of IFCs 260.

In many instances, the forwarding path elements perform lookup operations, such as a tree (or trie) search, a table (or index) search, a filter determination and application, or a rate limiter determination and application. Lookup operations locate, within a lookup data structure (e.g., a lookup tree), an item that matches packet contents or another property of the packet or packet flow, such as the inbound interface of the packet.

Control unit 202 may execute a plurality of applications, including service/tunnel color unit 212 and transport classification and propagation unit 220. Service/tunnel color unit 212 may perform, in response to receiving information via management interface 210, one or more operations including assigning a tunnel color to one or more tunnels (e.g., one or more tunnels of tunnels 14 or 16), linking a service color to one or more tunnel colors, and implementing instructions for load balancing network traffic. In some examples, and as described in more detail below, transport classification and propagation unit 220 may define, based on configuration data, transport classes 224A-224N ("transport classes 224"), resolve a service route to one or more underlay tunnel routes, store a correspondence of a service route to one of transport classes 224, e.g., in transport RIBs 226A-226N ("transport RIBs 226"), and/or identify one of transport classes 224 that corresponds to a service route for received network traffic for a network service for the service route. Each of transport Ms 226 corresponds to one of transport classes 224. Transport classes 224 may correspond to a service color assigned by the service/tunnel color unit 212.

Transport Ms 226 describe various transport routes within a network (e.g., network system 2 of FIGS. 1A and 1B), and the appropriate next hops for each route, i.e., the neighboring routing devices along each of the transport routes. Each of transport RIBs 226 is, e.g., a "Routing Table" as described in Section 9.1.2.1 of Y. Rekhteret al., "A Border Gateway Protocol 4 (BGP-4)," Internet Engineering Task Force (IETF) RFC 4271 (January 2006), the entire content of which is incorporated herein by reference. As described below, transport routes in transport RIBs 226 are exported out in a 'Transport-VPN' address family.

Control unit 202 may analyze information stored in a transport RIB 226 and RIB 228 and generate forwarding information for forwarding unit 206, which is stored in FIB 230. FIB 230 may associate, for example, network destinations with specific next hops and corresponding IFCs 260 and physical output ports that are used to forward received network traffic onto a transport tunnel for the correct transport class, based on the received transport routes.

Applications configured for execution by network device 200 determine one or more control processing operations to be applied to packets by packet processor 290. In network device 200, applications include service/tunnel color unit 212 and transport classification and propagation unit 220. Applications may configure packet processor 290 to perform the control processing operations by sending, to forwarding unit 206, data representing the control processing operations. Such data may include forwarding path elements representing high-level packet processing requirements (e.g., route lookup and filtering). Control processing operations may include fundamental packet forwarding operations such as input packet processing, route lookup, and output packet processing, as well as service functions such as packet filtering or access control, statistical sampling, traffic policing, rate limiting, and accounting.

In accordance with the techniques described in this disclosure, network device 200 may use a route target extended community or constraint to filter routes advertised to a node in a seamless MPLS segment routing network. Assume for example, network device 200 is an area border router (e.g., ABR 12B) that is locally connected to AN 10B1. Network device 200 may create, e.g., via management interface 210, one or more transport classes 224 (e.g., first transport class TC1 and second transport class TC2 of FIGS. 1A and 1B) assigned to AN 10B1, which instantiates an associated transport RIB 226 and a transport routing instance. In some examples, an administrator may configure network device 200 to classify a tunnel into an appropriate transport class 224, which causes control unit 202 to install routes of the tunnel in the corresponding transport RIB 226. For example, network device 200 may be configured to classify tunnels 14 into transport class 224A, which causes control unit 202 to install routes of tunnels 14 in transport RIB 226A. Similarly, network device 200 may be configured to classify tunnels 16 into transport class 224N, which causes control unit 202 to install routes of tunnels 16 in transport RIB 226N. Control unit 202 may then advertise the routes within transport RIBs 226 via a routing protocol message such as a BGP message (e.g., BGP-CT message).

As described in this disclosure, transport classification and propagation unit 220 of control unit 202 may use BGP 242 to generate and hold one or more BGP messages to advertise routing information for AN 10B1 for the configured transport classes. For example, transport classification and propagation unit 220 may generate and hold a first respective BGP message of the one or more BGP messages to advertise routing information for AN 10B1, where the first respective BGP message comprises routing information for AN 10B1 (e.g., loopback address and MPLS label bindings) for transport class 224A (e.g., first transport class TC1). As one example, transport classification and propagation unit 220 may generate and hold a first respective BGP message comprising an address-specific route target including a transport class 224A (e.g., first transport class TC1). As one particular example, the address-specific route target includes a global administrator field encoded with the loopback address of AN 10B1 and a local administrator field encoded with transport class 224A (e.g., first transport class TC1). Transport classification and propagation unit 220 of control unit 202 may also generate and hold a second respective BGP message of the one or more BGP messages, where the second respective BGP message comprises routing information for AN 10B1 for transport class 224N (e.g., second transport class TC2). As one example, transport classification and propagation unit 220 may generate and hold a second respective BGP message comprising an address-specific route target including transport class 224N (e.g., second transport class TC2). As one particular example, the address-specific route target includes a global administrator field encoded with the loopback address of AN 10B1 and a local administrator field encoded with transport class 224N (e.g., second transport class TC2).

Network device 200 may receive, from a BGP peer (e.g., ABR 12A), a BGP message generated by a remote access node (e.g., AN 10A1) to request for routing information for AN 10B1 for at least one traffic class. The BGP message may include a route target extended community or constraint encoded with an address-specific route target identifying AN 10B1 and transport class 224A or transport class 224N. For example, transport classification and propagation unit 220 may determine that the received BGP message includes a route target extended community or constraint encoded with an address-specific route target comprising a global administrator field encoded with a loopback address of AN 10B1 and a local administrator field encoded with transport class 224A (e.g., first transport class TC1).

In response, transport classification and propagation unit 220 sends the first respective BGP message comprising routing information for AN 10B1 for transport class 224A (e.g., first transport class TC1) to the BGP peer, which in turn sends the BGP message to AN 10A1 for import.

In some examples, network device 200 (when operating as ABR 12B) may receive a single BGP message to request for reachability information of all transport classes of ANs 10B. For example, network device 200 may receive a single BGP message with a prefix range for all of ANs 10B. In this example, transport classification and propagation unit 220 sends BGP messages comprising routing information for AN 10B1 for all of transport classes 224 to the BGP peer, which in turn sends the BGP messages to AN 10A1 for import.

Alternatively, network device 200 may represent access node, e.g., AN 10A1 of FIG. 1, that requests for routing information for AN 10B1 for the first transport class TC1 by sending a BGP message, e.g., BGP message 19, with a route target extended community or constraint 20' including the address-specific RT 20. For instance, transport classification and propagation unit 220 of network device 200 (when operating as AN 10A1), may generate BGP message 19 with route target extended community or constraint 20' including the address-specific RT 20 comprising the global administrator field encoded with the loopback address (10.10.10.2) of AN 10B1 and the local administrator field encoded with the first transport class TC1. Network device 200 may send the BGP message to its local ABR, e.g., ABR 12A, which forwards the BGP message to a BGP peer (e.g., ABR 12B). ABR 12B may send a BGP message, e.g., BGP message 18, to ABR 12A, to advertise reachability information for AN 10B1 associated with the first traffic class TC1. As described above, BGP message 18 includes the loopback address of AN 10B1 within the BGP NLRI, the MPLS label bindings of AN 10B1 (e.g., segment identifier of AN 10B1), and an address-specific RT 20 encoded with the first transport class TC1 (e.g., wherein the global administrator field of the RT is encoded with the loopback address of AN 10B1 and the local administrator field of the RT is encoded with the first transport class TC1).

In response to receiving BGP message 18, transport classification and propagation unit 220 of network device 200 may determine that BGP message 18 comprises address-specific route target 20, and imports the routing information (e.g., by storing the route in its transport RIB).

Network device 200 may then receive, via IFCs 260, network traffic. Control unit 202 determines that the network traffic is associated with the network service corresponding to the mapping community of a service route. Further, transport classification and propagation unit 220 identifies transport class 224A as corresponding to the service route based on the stored association between the service route and the transport class 224A. Control unit 202 causes forwarding unit 206 to forward the network traffic along the one or more underlay tunnels (e.g., tunnels 14 or 16) specified by the transport class 224 corresponding to the service route. For example, transport classification and propagation unit 220 further retrieves, from transport RIB 226A, the transport route for the service route and forwards the network traffic to a next hop for the network service specified by transport RIB 226A. In some examples, to forward the network traffic to the next hop, forwarding unit 206 retrieves, from FIB 230, a next hop and forwards, via IFCs 260, the network traffic to the next hop.

Figure 3:
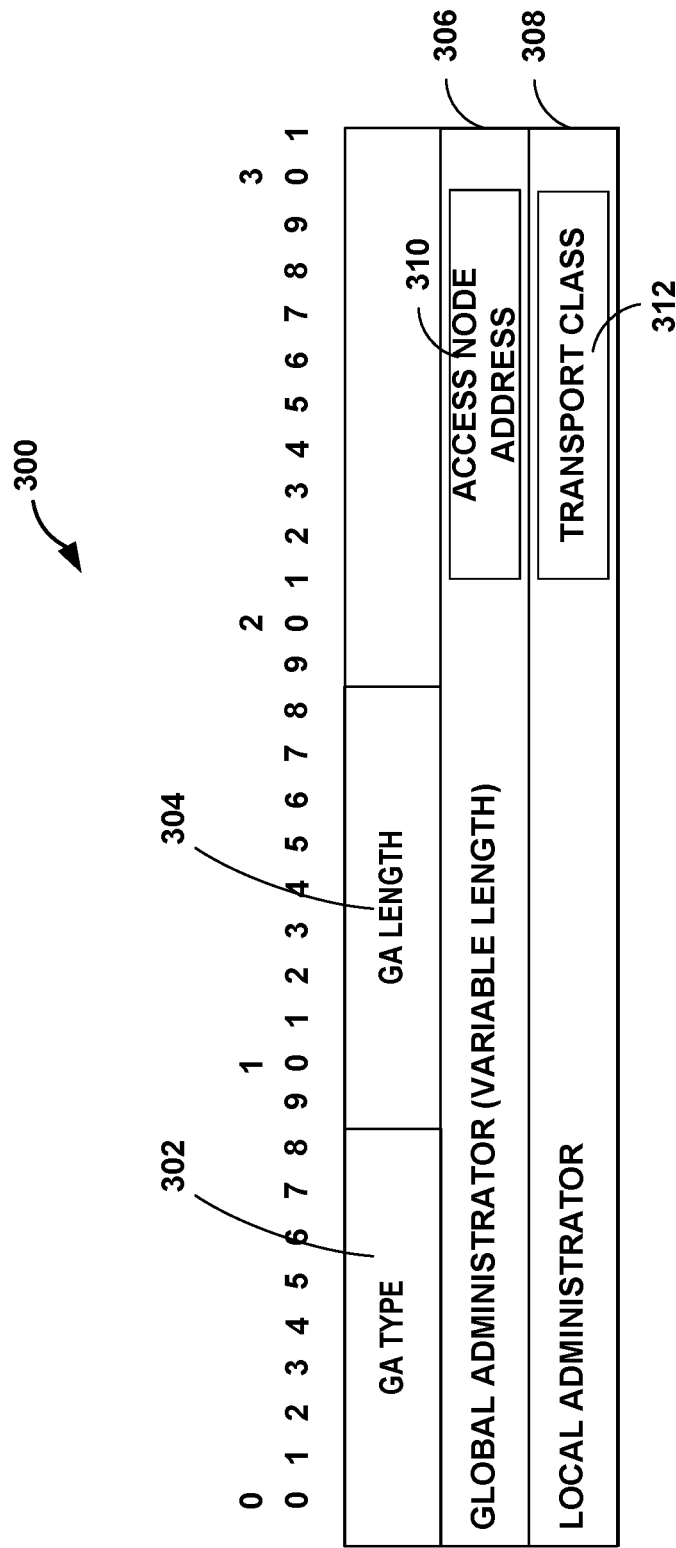
FIG. 3 is a block diagram illustrating an example route target constraint used to filter routes advertised to a node in a seamless MPLS network.

FIG. 3 is a block diagram illustrating an example address-specific route target, in accordance with the techniques described in this disclosure. In the example of FIG. 3, address-specific route target 300 may represent a transitive BGP extended community container as described in S. Sangli, et al., "BGP Extended Communities Attribute," Request for Comments 4360, February 2006, the entire content of which is incorporated by reference herein. The BGP community container may include a global administrator (GA) type 302, a global administrator length 304, a global administrator field 306, and a local administrator field 308.

Global administrator type 302 may include an autonomous system number, an IPv4 address, or an IPv6 address. For a global administrator type 302 of autonomous system number, the global administrator length 304 may include a length of 4-octets. For a global administrator type 302 of IPv4 address, the global administrator length 304 may include a length of 4-octets. For a global administrator type 302 of IPv6 address, the global administrator length 304 may include a length of 16-octets.

In accordance with the techniques described in this disclosure, global administrator field 306 may be encoded with an access node address 310 of an access node. The access node address 310 identifies the access node that routing information is being requested. The access node address 310 may be a loopback address of the access node (e.g., 10.10.10.2 of AN 10B1 of FIG. 1A). Local administrator field 308 may be encoded with a transport class 312 associated with the access node. The transport class 312 identifies the transport class associated with the access node for which the routing information is being requested (e.g., first transport class TC1).

In some examples, loopback address 310 may be encoded with a prefix range of the access network to request for routing information of an access node for all transport classes associated with the access nodes of the access network.

Figure 4:
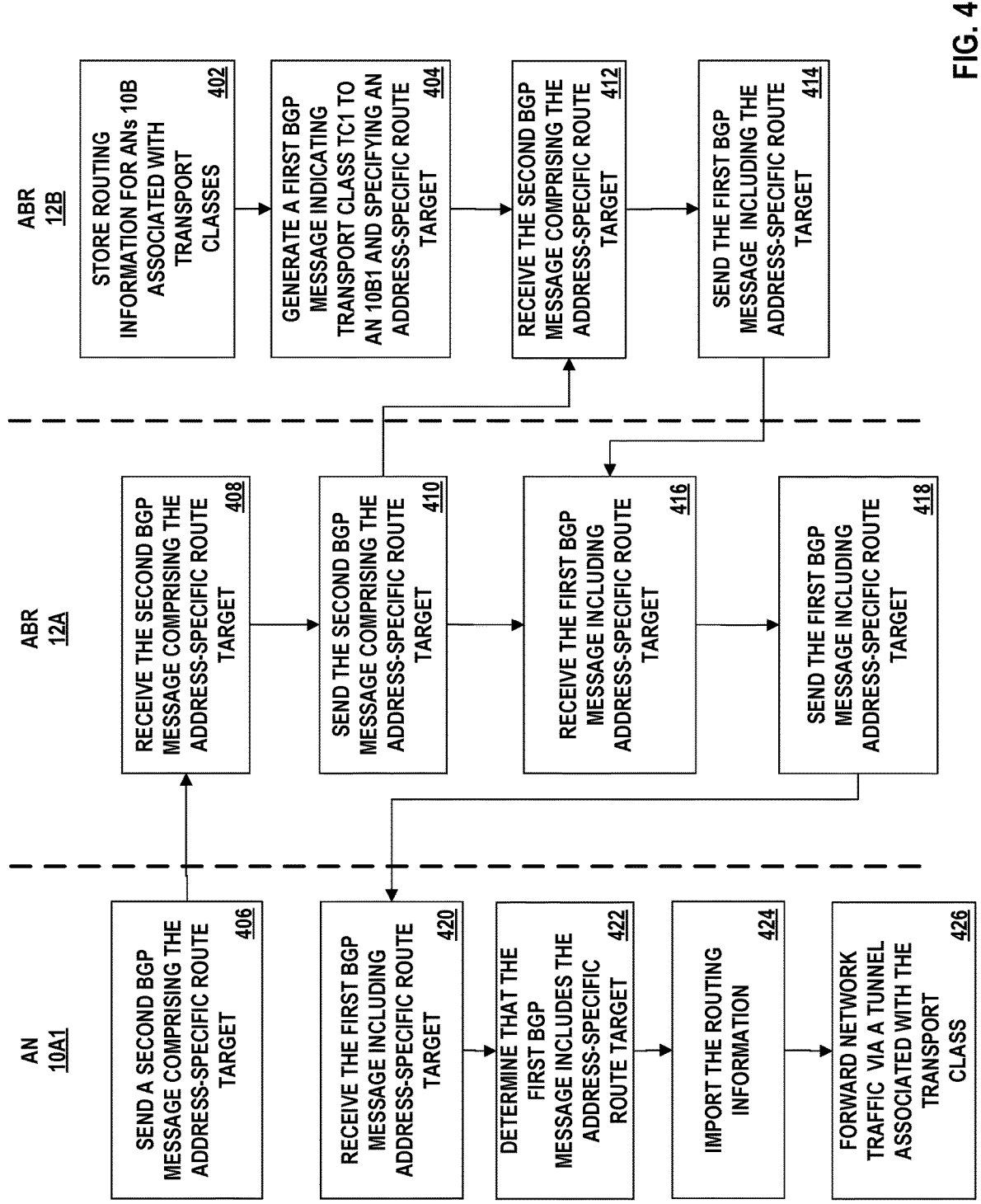
FIG. 4 is a flowchart illustrating an example operation in accordance with the techniques described in this disclosure.

FIG. 4 is a flowchart illustrating an example operation in accordance with the techniques described in this disclosure. For ease of illustration, FIG. 4 is described with respect to network system 2 of FIGS. 1A and 1B.

In the example of FIG. 4, an area border router, e.g., ABR 12B, that is connected to access network 6B and core network 8, stores routing information for access nodes 10B associated with one or more transport classes (402). For example, access node 10B1 may be associated with one or more transport classes, such as a first transport class TC1 and/or a second transport class TC2. ABR 12B may store routing information, such as a loopback address (e.g., 10.10.10.2) and MPLS label bindings (e.g., segment identifier) of access node 10B1, for a transport class in a respective transport RIB. For instance, ABR 12B may include a first transport RIB to store routing information for access node 10B1 for the first transport class TC1 and a second transport RIB to store routing information for access node 10B2 for the second transport class TC2.

ABR 12B may generate and hold one or more BGP messages to advertise the routing information for ANs 10B for the one or more transport classes (404). For example, ABR 12B may generate BGP message 18 ("the first BGP message") for advertising routing information for AN 10B1 for the first transport class TC1. More specifically, ABR 12B may generate BGP message 18 comprising routing information (e.g., loopback address and MPLS label bindings) for access node 10B1, the BGP message 18 indicating the first transport class TC1 and specifying an address-specific route target 20. As one example, the address-specific route target 20 may comprise a global administrator field encoded with the loopback address of access node 10B1 and a local administrator field encoded with the first transport class TC1.

ABR 12B may construct BGP message 18, but does not send the BGP message until it receives from a BGP peer a BGP-CT message with a route target extended community or constraint including the address-specific route target. For example, an access node, e.g., AN 10A1, may request for routing information for AN 10B1 for the first transport class TC1 by sending a BGP-CT message, e.g., BGP message 19 ("the second BGP message") with a route target extended community or constraint 20' including the address-specific route target 20 to trigger ABR 12B to send BGP message 18 (406). As one example, AN 10A1 may send, to its local ABR, e.g., ABR 12A, BGP message 19 with route target extended community or constraint 20' including the address-specific route target 20. As one particular example, BGP message 19 may comprise a route target constraint 20' encoded with the address-specific route target 20. In response to receiving BGP message 19 with the address-specific route target 20 (408), ABR 12A sends BGP message 19 with the address-specific route target 20 to BGP peers, e.g., ABR 12B (410). ABR 12B may keep track of which access nodes have sent a BGP message with a route target extended community or constraint such that ABR 12A may send BGP messages including routing information to the corresponding access nodes.

In response to receiving BGP message 19 with address-specific route target 20 (412), ABR 12B may send BGP message 18 generated by ABR 12B including the routing information for AN 10B1 for the first transport class TC1 (414). For example, ABR 12B may determine that BGP message 19 includes the address-specific RT 20 (e.g., encoded in route target constraint 20'). As one particular example, ABR 12B may determine that BGP message 19 includes a global administrator field encoded with the loopback address of AN 10B1 and a local administrator field encoded with the first transport class TC1. In response, ABR 12B sends BGP message 18 to ABR 12A to advertise the routing information for AN 10B1 for the first traffic class TC1. As described above, BGP message 18 may include the loopback address of AN 10B1 within the BGP NLRI, the MPLS label bindings of AN 10B1 (e.g., segment identifier of AN 10B1), and an address-specific RT 20 encoded with the first transport class TC1 (e.g., wherein the global administrator field of the RT is encoded with the loopback address of AN 10B1 and the local administrator field of the RT is encoded with the first transport class TC1).

ABR 12A receives BGP message 18 including the routing information for AN 10B1 for the first transport class TC1 (416) and sends BGP message 18 to the access node that sent the BGP message including the address-specific route target 20, e.g., access node 10A1. In response to receiving BGP message 18 (420), AN 10B1 determines that BGP message 18 includes the address-specific route target 20 (422), and stores the routing information for AN 10B1 for the first transport class TC1 (424). In this way, AN 10A1 may use the routing information for AN 10B1 for the first transport class TC1 to send traffic to AN 10B1 on an end-to-end tunnel (e.g., tunnel 14) according to the first transport class TC1 (426).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A method comprising:
   generating, by a first router of a first network, a first border gateway protocol (BGP) message to advertise routing information for a first node of the first network, the first BGP message indicating a transport class and specifying an address-specific route target encoded with an address of the first node of the first network, the transport class comprising one or more tunnels to the first node that share common characteristics;
   receiving, by the first router from a second router of a second network, via a core network connecting the first network and the second network and implementing a Multiprotocol Label Switching (MPLS) network with the first network and the second network, a second BGP message originated by a second node of the second network, the second BGP message comprising the address-specific route target encoded with the address of the first node to request for routing information for the first node of the first network; and
   sending, by the first router and based on determining that the received second BGP message comprises the address-specific route target encoded with the address of the first node, the first BGP message including the address-specific route target encoded with the address of the first node to the second router for sending the first BGP message to the second node to cause the second node to import the routing information for the first node based on the address-specific route target encoded with the address of the first node.

2. The method of claim 1, wherein the address-specific route target comprises a global administrator field encoded with the address of the first node and a local administrator field encoded with the transport class.

3. The method of claim 1, wherein the first BGP message comprises a BGP classful transport message.

4. The method of claim 1, the method further comprising:
   generating, by the first router, a third BGP message to advertise routing information for the first node of the first network, the third BGP message indicating a second transport class and specifying a second address-specific route target encoded with the address of the first node of the first network, the second transport class comprising one or more different tunnels to the first node that share common characteristics;
   receiving, by the first router and from a second router of a second network, a fourth BGP message originated by the second node of the second network, the fourth BGP message comprising the second address-specific route target to request for routing information for the first node of the first network; and
   sending, by the first router in response to receiving the fourth BGP message comprising the second address-specific route target, the third BGP message to the second router for sending to the second node to cause the second node to import the routing information advertised by the third BGP message.

5. The method of claim 1, wherein the second BGP message originated by the second node comprises a route target constraint encoded with the address-specific route target.

6. The method of claim 1, wherein the MPLS network implemented with segment routing.

7. A method comprising:
   sending, by a first node of a first network and to a first router of the first network, a first border gateway protocol (BGP) message to request for routing information for a second node of a second network, the first BGP message comprising an address-specific route target encoded with an address of the second node of the second network;
   receiving, by the first router from a second router of the second network and in response to sending the first BGP message comprising the address-specific route target encoded with the address of the second node of the second network, via a core network connecting the first network and the second network and implementing a Multiprotocol Label Switching (MPLS) network with the first network and the second network, a second BGP message originated by the second node of the second network, the second BGP message indicating a transport class and specifying the address-specific route target encoded with the address of the second node, the transport class comprising one or more tunnels to the second node that share common characteristics;
   importing, by the first node and based on determining the second BGP message comprises the address-specific route target encoded with the address of the second node, the routing information for the second node of the second network; and
   forwarding, by the first node and based on the routing information for the second node, network traffic to the second node via a tunnel associated with the transport class.

8. The method of claim 7, wherein the address-specific route target comprises a global administrator field encoded with the address of the second node and a local administrator field encoded with the transport class.

9. The method of claim 7, wherein the first BGP message comprises a BGP classful transport message.

10. The method of claim 7, the method further comprising:
    sending, by the first node and to the first router of the first network, a third BGP message to request for routing information for the second node of the second network, the third BGP message comprising a second address-specific route target;
    receiving, by the first node and from the first router, a fourth BGP message originated by the second node, the fourth BGP message indicating a second transport class and specifying the second address-specific route target, the second transport class comprising one or more different tunnels to the second node that share common characteristics;
    importing, by the first node in response to receiving the fourth BGP message comprising the second address-specific route target, the routing information for the second node of the second network based on the second address-specific route target; and forwarding, by the first node and based on the routing information for the second node, network traffic to the second node via a second tunnel associated with the second transport class.

11. The method of claim 7, wherein the first BGP message originated by the first node comprises a route target constraint encoded with the address-specific route target.

12. The method of claim 7, wherein the MPLS network implemented with segment routing.

13. A first router connected to a first network and a core network, the first router comprising:
one or more processors operably coupled to a memory, wherein the one or more processors are configured to:
generate a first border gateway protocol (BGP) message to advertise routing information for a first node of the first network, the first BGP message indicating a transport class and specifying an address-specific route target encoded with an address of the first node of the first network, the transport class comprising one or more tunnels to the first node that share common characteristics;
receive, from a second router of a second network, via the core network connecting the first network and the second network and implementing a Multiprotocol Label Switching (MPLS) network with the first network and the second network, a second BGP message originated by a second node of the second network, the second BGP message comprising the address-specific route target encoded with the address of the first node to request for routing information of the first node of the first network; and
send, based on determining that the received second BGP message comprises the address-specific route target encoded with the address of the first node, the first BGP message including the address-specific route target encoded with the address of the first node to the second router for sending the first BGP message to the second node to cause the second node to import the routing information for the first node based on the address-specific route target encoded with the address of the first node.

14. The first router of claim 13, wherein the address-specific route target comprises a global administrator field encoded with the address of the first node and a local administrator field encoded with the transport class.

15. The first router of claim 13, wherein the second BGP message comprises a BGP classful transport message.

16. The first router of claim 13, the one or more processors are further configured to:
generate a third BGP message to advertise routing information for the first node of the first network, the third BGP message indicating a second transport class and specifying a second address-specific route target encoded with an address of the first node of the first network, the second transport class comprising one or more different tunnels to the first node that share common characteristics;
receive, from the second router of the second network, a fourth BGP message originated by the second node, the fourth BGP message comprising the second address-specific route target to request for the routing information for the first node of the first network; and
send, in response to receiving the fourth BGP message comprising the second address-specific route target, the third BGP message to the second router for sending to the second node to cause the second node to import the routing information advertised by the third BGP message.

17. The first router of claim 13, wherein the second BGP message originated by the second node comprises a route target constraint encoded with the address-specific route target.

18. The first router of claim 13, wherein the MPLS network implemented with segment routing.

* * * * *